Patented July 5, 1938

2,122,424

UNITED STATES PATENT OFFICE 2,122,424

DIAZOAMINO COMPOUNDS AND THEIR MANUFACTURE

Jean G. Kern, Hamburg, N. Y., assignor to National Aniline and Chemical Company, Inc., New York, N. Y., a corporation of New York No Drawing. Application August 16, 1934, Serial No. 740,179

22 Claims. (Cl. 260—69)

This invention relates to a new type of diazoamino compounds and to compositions of matter containing them. The diazoamino compounds of the present invention are especially suitable for use in the art of dyeing textile fibers of any origin, for instance in the dyeing or printing of cellulose, either natural fibers or regenerated cellulose, cellulose esters or ethers, silk, wool, or hair fibers or fabrics. The diazoamino compounds of the present invention also are useful as germicides, bactericides, and insecticides.

The diazoamino compounds of the present invention may be represented by the general formula

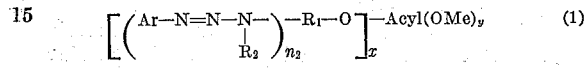   (1)

wherein Ar represents an aromatic radical, which may be further substituted; $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain, and the groups $R_1$ and $R_2$ are joined to the —N— of the formula by a carbon of the $R_1$ and $R_2$ except in the case where $R_2$ represents H, and $R_1$ is joined to the ester group of the formula by a carbon of the $R_1$ group and $R_1$ and $R_2$ may contain as substituents alkyl, hydroxy, alkoxy, aryloxy, sulfo, sulfato groups, halogen or a polymethylene chain, and $R_2$ may contain an ester group of the type shown joined to $R_1$ in the formula;

Acyl represents the residue of sulfuric acid, phosphoric acid, or a polybasic acid of the benzene or aliphatic series; i. e., Acyl represents the radical formed by subtracting the acid OH groups from the organic or inorganic acid, thus from $H_2SO_4$ two OH groups are subtracted leaving $SO_2$ as the Acyl group corresponding to this acid and from phthalic acid $C_6H_4(COOH)_2$ two OH groups are subtracted leaving $C_6H_4(CO)_2$ as the Acyl group corresponding to this acid;

Me represents hydrogen or a metal;

$n_2$ represents a positive integer;

$x$ represents the number of esterified hydroxyl groups of the acid; and $y$ represents the number of unesterified hydroxyl groups of the acid.

It should be noted in connection with the above formula that one, two, or more amino-diazo groups, —N=NR$_1$(R$_2$)—OAcyl(—OMe)$_y$ may be joined to Ar; that is, the compounds may include not only diazo nuclei but tetrazo nuclei and so on. Further, Ar may contain one or more other substituents, e. g. halogen, nitro, alkyl, aryl, aralkyl, alkylaryl, alkoxy, aryloxy, azo, primary, secondary, or tertiary amino, sulfo, sulfite, hydroxy, and carboxy substituents.

The diazoamino compounds of especial importance and which constitute one of the preferred embodiments of my invention may be represented by the formula:

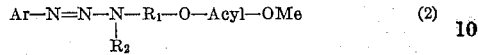   (2)

wherein, Ar has the value previously ascribed but is free from groups conferring solubility in water, sulfonate and carboxylate groups in particular; $R_1$ represents a hydrocarbon group, $R_2$ represents hydrogen or a hydrocarbon group, or $R_1$ and $R_2$ together represent a hydrocarbon group [i. e. hydrocarbon groups of the classes assigned in connection with Formula (1)];

Acyl has the value previously ascribed but preferably represents $SO_2$;

Me represents hydrogen, sodium, or potassium.

The compounds of my invention are especially applicable to the dyeing of textile fibers and may be used for this purpose in a manner similar to diazo or nitrosamine compositions. The diazoamino compounds of this invention are stable in the presence of coupling components and hence may be used for the preparation of stable dye compositions comprising one or more of the diazoamino compounds and a suitable coupling component or components.

Coupling of the diazoamino compounds of this invention with the coupling components normally employed with the corresponding diazo compounds may be effected by treatment with acid, as by introducing an acid into the bath containing a solution of the diazoamino compound and the coupling component, or by subjecting fibers containing a coupling component to the action of an acidified bath of the diazoamino compound or by subjecting fibers impregnated with a solution or paste of the diazoamino compound and a coupling component to the action of an acid bath or acid vapors. In the case of the diazoamino compound of the present invention coupling is much more energetic and more complete than with the diazoamino compounds formerly employed, and dyeings of greater depth and brilliance are therefore obtained. The reason for the improved results in these respects appears to lie in the fact that cleavage of the diazoamino linkage is accompanied by breakage of the link binding the organic residue $R_1$ above to the polybasic acid radical. Thus one acid radical is set free and the action of this free acid radical materially promotes further cleavage of the diazoamino linkage. The cleavage is most complete in the case of diazoamino compounds formed by the coupling of a diazo compound with the partial ester of a hydroxy organic primary or secondary amine and an inorganic polybasic acid of the class previously mentioned or a strong organic polybasic acid. The double cleavage which takes place using the diazoamino compounds of this invention may be demonstrated by the following equation:

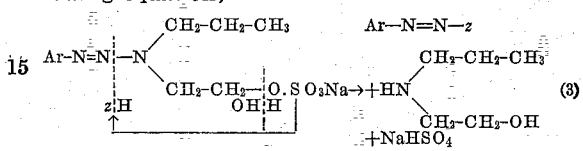

The products of the present invention are suitable for the preparation of either water soluble or water insoluble azo dyes. They are especially suited for the production of azo dyes of the insoluble type and the invention in its preferred aspects is directed to the diazoamino compounds or compositions derived from diazo compounds free from sulfonate or carboxylate groups and, in the case of compositions containing a coupling component, to components free from such groups.

The diazoamino compounds of this invention, especially those in which the amino ester group comprises an —$OSO_2OMe$ radical, wherein Me represents H, Na, or K, possess notable solubility in water or aqueous alkaline solutions and hence are especially valuable for use where rapid and complete solution is desirable; this property constitutes a marked advantage of the compounds of the present invention whether they are employed as dyestuffs, or insecticides, bactericides, etc.

The diazoamino compounds of the present invention may be prepared by coupling an aromatic diazonium salt of the general formula:

$$Ar-(N=N-z)_{n_1} \quad (4)$$

wherein Ar represents an aromatic radical as previously set forth, $z$ represents an acid group, for example Cl, and $n_1$ represents a positive integer indicating the number of diazo substituents on the aromatic residue, preferably 1, 2, or 3, with the stoichiometrical quantity of a primary or secondary amino partial ester of the general formula:

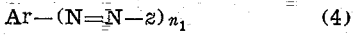

wherein $R_1$, $R_2$, Acyl, Me, $x$ and $y$ have the values previously ascribed in the discussion of Formula 1 and $n_2$ represents a positive integer indicating the number of primary or secondary amino groups joined to the organic radical $R_1$, preferably 1, 2, or 3.

The reaction to form the diazoamino compound proceeds at low temperatures. The coupling of the diazonium salt with the amino partial ester is advantageously effected by bringing together aqueous solutions of the individual reactants in the presence of an alkaline medium which serves to bind the acid liberated by the coupling. The diazoamino compound may be recovered by crystallization, including salting out, or by drying the solution containing it in vacuum or in other suitable manner, for instance with the aid of an inert gas or on a rotary drum drier.

In its preferred aspects my invention comprehends the preparation of dyestuff compositions containing a coupling component or developer and a diazoamino compound of one of the following types:

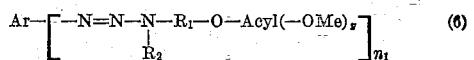

and

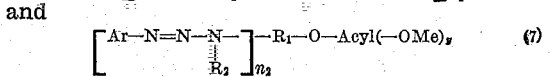

wherein Ar represents an aryl group, e. g. phenyl, naphthyl, diphenyl, anthranyl, anthraquinonyl, or carbazole, which may contain as substituents one or more of the following: chlorine, bromine, nitro, alkyl, aryl, aralkyl, alkylaryl, alkoxy, aryloxy, azo, amino, sulfo, hydroxy, and carboxy groups; $R_1$ represents a hydrocarbon group, $R_2$ represents hydrogen or a hydrocarbon group, or $R_1$ and $R_2$ together represent a hydrocarbon group [i. e. hydrocarbon groups of the classes assigned in connection with Formula (1)];

Me represents hydrogen or a metal, $y$ represents a positive integer, preferably 1 or 2, and $n_1$ or $n_2$ represents a whole number, in particular 1, 2, or 3.

The diazoamino compounds of the type represented by Formula 6 may be prepared by coupling an aromatic mono- or poly-diazonium salt with an amino partial ester. The coupling may be represented by the following equation:

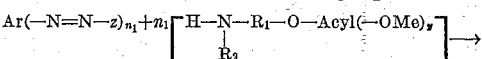
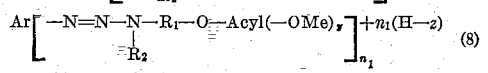

Preparation of the diazoamino compounds represented by Formula 7 is effected in a similar manner and may be represented by the following equation:

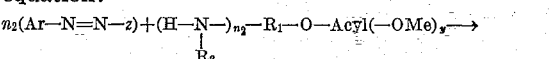
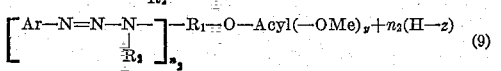

In either case it is advantageous to add an alkaline reagent to bind the acid liberated during the coupling. The alkaline reagent may be added either during coupling or after as desired.

The proportion of coupling component to diazoamino compound in the compositions of my invention may vary widely. Preferably, however, I mix the two constituents in about stoichiometrical quantities. The compositions may comprise the constituents in dry form or in solution. The dry composition may be prepared by mechanical admixture of the two constituents in solid phase or by evaporating a solution of the two constituents.

While the present invention is of general applicability to the class of compounds indicated above, especially those of Formulae (6) and (7), I have found that the best results may be obtained when the diazoamino compounds are prepared by the reaction of an aromatic diazonium salt with a sulfuric acid partial ester of hydroxylated aliphatic amines, either primary or secondary. As previously indicated, such compounds, which contain at least one —$OSO_2OMe$ radical, possess properties rendering them especially suitable for the purposes of this invention. When the esters are those of polyhydroxy aliphatic amines, one or more of the hydroxy groups may be esterified. The products prepared as just indicated are diazoamino-aliphatic sulfuric acid partial esters, including both the free acids and their metal salts, the alkali-metal salts and particularly the sodium salts being the preferred form of these compounds for use in admixture with the various known coupling components.

The compositions containing a diazoamino compound of the present invention and a coupling component, may be applied to textile fibers in the usual manner. They are particularly suitable for the dyeing of fabrics by the printing process. A printing paste is prepared by mixing together about stoichiometrical quantities of a diazoamino compound of the type previously defined and a coupling component, adding to the mixture sodium hydroxide solution in quantity sufficient to dissolve the components and making up the mixture to a printing paste in the usual manner by adding thereto a thickening agent such as starch or gum tragacanth and the necessary quantity of water. If desired, Turkey red oil or other assistants or solvents may be added. The fabric is printed with this printing paste in the usual manner; then, either with or without drying and steaming it is treated for a short time, say around 20 seconds, in a bath containing an acid, for example 3% to 10% of formic acid, acetic acid, or oxalic acid at a temperature between 50° and 90° C. The bath may also contain other assistants, penetrants, etc., for example around 10% of Glauber's salt ($Na_2SO_4 10H_2O$), or sodium chloride ($NaCl$), or sodium acetate ($CH_3COONa$). Instead of developing the dye in an acid bath, it may be developed by passing it through an acid vapor ager containing, for example, steam and vapors of acetic or formic acid or both. After development of the print in any of the above manners, it may be rinsed, washed, and dried in the customary manner.

As mentioned earlier in this application, the diazoamino compound of the present invention may be prepared from diazotized aromatic amines and primary or secondary amines containing a partial ester group. The partial ester group may be introduced into the amine by melting and fusing together and/or by condensing in appropriate solvents, and/or in the presence of catalysts, the free polybasic acids or their anhydrides or acid chlorides or mixtures thereof and an hydroxylated amine in its free state or in its combined N— salt state.

Since the esterification of hydroxy compounds is well known, the description of the preparation of the compounds and compositions of the present invention will be described in the examples commencing with the amino organic partial esters. The invention is of a broad scope and the examples are inserted as a demonstration of its general applicability and not by way of limitation. Thus the invention may be applied to diazo compounds obtained by diazotization of the following aromatic amines:

3-chlor-aniline,
4-chlor-2-amino-1-methyl benzene,
4-chlor-2-amino-1-methoxy-benzene,
4-nitro-2-amino-1-methyl-benzene,
5-nitro-2-amino-1-methyl-benzene,
3-nitro-4-amino-1-methyl-benzene,
5-chlor-2-amino-1-methyl-benzene,
3-chlor-2-amino-1-methyl-benzene,
6-chlor-2-amino-1-methyl-benzene,
3-chlor-4-amino-1-methyl-benzene,
4,5-dichlor-2-amino-1-methyl-benzene,
2,5-dichlor-4-amino-1-methyl-benzene,
6-benzoylamino -4- chlor-3-amino-1-methoxy-benzene,
2,5-dichlor-1-amino-benzene,
1-amino-anthraquinone,
1-amino-4-benzoylamino-anthraquinone,
anilin-4-sulfonic acid,
2,5-dichlor-aniline-4-sulfonic acid,
2-amino-diphenyl-sulfone,
2-amino-4'-methyl - diphenyl - sulfone-4-sulfonic acid,
2-amino-4'-hydroxy - diphenyl-sulfone-3'-carboxy-4-sulfonic acid,
2-amino-5-chlor-1-benzoic acid methyl ester,
2-amino-4-methyl-5-nitro-benzoic acid,
1-amino-anthraquinone-2-sulfonic acid,
2-amino-1-carboxy-benzene-4-sulfonic acid,
2-amino-4-methoxy -5- phenylamino-1-chloro-benzene,
4,6-dichloro-2-amino-1-methyl-benzene,
2,4-dimethyl-aniline,
3-amino-4-methoxy -6- nitro -1- methyl - benzene,
3-amino-4-methoxy-6-benzoylamino-1-methyl-benzene,
3-benzoylamino-4,6-dimethoxy-aniline,
4,4'-diamino-3,3'-dimethoxy-azobenzene,
2,6-dimethoxy-4-benzoylamino-aniline,
2,5-dimethoxy-4-benzoylamino-aniline,
2-methoxy-4-benzoylamino-5-ethoxy-aniline,
4-nitro-4'-amino-2',5'-dimethoxy-azobenzene,
3-nitro-4'-amino-2',5'-dimethoxy-azobenzene,
4-methyl-4'-amino -2- methoxy-5-methyl-azobenzene,
4-chloro-4'-amino-2',5'-diethoxy-azobenzene.

The following partial esters illustrate the wide variety of compounds which may be coupled with diazo compounds to produce the diazoamino compounds of the present invention:

methyl-amino-butyl-sulfuric acid,
ethyl-amino-butyl-sulfuric acid,
hydroxy-ethyl-amino-ethyl-sulfuric acid,
amino-diethyl-disulfuric acid,
cyclohexylamino-ethyl sulfuric acid,
N-(beta-ethyl-hexyl)-amino-ethyl sulfuric acid,
N-(beta - ethyl-cyclohexyl)-amino - ethyl sulfuric acid,
hydroxy-ethyl-amino-ethyl-phthalic acid,
the sulfonic ester from ethanolamine and 4-sulfo-benzoic acid,
methyl-amino-ethyl-dichlor-phthalic acid,
sulfo-ethyl-amino-butyl-sulfuric acid,
the mono (methylamino-ethyl-ester) of benzene-p-disulfonic acid,
the disulfonic ester from dipropanol amine and 4-sulfo-benzoic acid,
mono-(methyl-amino-ethyl)-maleic acid ester,
N-n-butyl-amino-ethyl-sulfuric acid,
isohexylamine-beta-sulfuric acid,
tetrahydro-naphthylamine-ethyl-sulfuric acid,
the disulfonic ester from diethanolamine and 3-sulfo-benzoic acid,
piperidine-beta-sulfuric acid,
cyclo-hexyl-amine-B-sulfuric acid,
pyrrolidine-alpha-methyl-sulfuric acid,
the sulfonic ester from methyl-ethanolamine and 4-sulfo-benzoic acid,
methylamino-ethyl-acid-succinate,
methylamino-ethyl-acid-chlor-maleate,
ethylamino-ethyl-phthalic acid,
methylamino-propyl-sulfuric acid,
methyl-amino-ethyl-phosphoric acid ester,
2,5-dichloro-phenyl-amino-butyl-sulfuric acid,
4-methoxy-phenyl-amino-ethyl-sulfuric acid,
4-methoxy - phenyl - amino - diethyl - sulfuric acid,
3-chloro-tolyl-amino-butyl-sulfuric acid, The illustrative partial esters have been set forth above in terms of the free acids. Normally it is advantageous to employ these partial esters in the form of a salt. Hence they may be employed in the form wherein the hydrogen or hydrogens of the acid groups are substituted by a metal, e. g. sodium or potassium.

Any of the coupling components in use for coupling with diazo compounds may be employed with the diazoamino compounds of the present invention, for instance the naphthols and naphtholates, 2,3-hydroxy naphthoic acid arylides, alkyl phenyl-pyrazolones, aceto-acetic acid arylides, 2-hydroxy-carbazole-o-carbonic arylides, and the 2,4-dihydroxy-quinolines. Specific examples of these coupling components are given in connection with the following examples and in the table of dyestuff compositions which is a part hereof.

The following examples will serve to further illustrate the present invention.

*Example 1.*—100 parts by weight of 3-chloraniline are diazotized in the customary manner by means of hydrochloric acid and sodium nitrite to yield an aqueous solution of 3-chlorphenyl-diazonium chloride. This solution is gradually run into an aqueous solution of the sodium salt of N-methyl-amino-butyl-sulfuric acid. The ester solution comprises about 150 parts of the ester, about 400 parts of sodium acetate, and about 1000 parts of water. During the addition of the diazonium chloride, the aqueous ester solution is stirred and cooled so as to maintain the temperature at 0° to 5° C. The diazonium chloride addition is regulated to avoid any substantial rise in temperature. After the addition of the diazonium chloride is completed, the solution is made alkaline with soda ash in slight excess and agitated at 0° C. for from one to two hours or until no free diazonium chloride can be detected. The diazoamino ester salt which forms has the following formula:

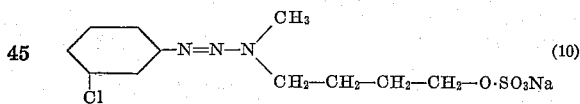

The diazoamino sodium sulfate is then salted out from the solution by adding thereto 200 parts of sodium chloride. The crystallized ester is separated by filtration or centrifuging and is dried. The product is a yellow powder readily soluble in water.

The isolation of the diazoamino compound may be effected in a number of ways. Normally it is desirable to add a neutralizing agent to the solution during coupling of the diazonium salt with the amine or after the coupling is complete. Instead of sodium carbonate any other suitable alkaline neutralizing agent, either organic or inorganic, may be employed, for example sodium hydroxide, magnesia, magnesium carbonate, barium carbonate, calcium carbonate, pyridine and its homologues, and triethanolamine.

*Example 2.*—100 parts by weight of 2-methyl-5-chlor-aniline,

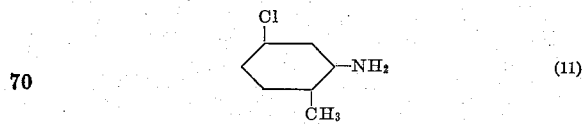

are diazotized and the diazonium salt solution is added to an aqueous solution of methylamino-butyl-sodium-sulfate containing about 150 parts of the partial ester salt. The product may be recovered from solution in the same manner as in Example 1 or the aqueous solution may be evaporated to dryness in a vacuum or on a double drum drier under reduced pressure. The product is a yellow powder readily soluble in water, having the probable formula:

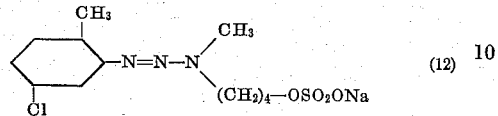

In a similar manner diazoamino compounds may be prepared from the other chlor- and nitro-substituted anilines previously mentioned and methylamino-butyl-sulfuric acid or alkali-metal salts thereof. The products thus formed are yellow to orange powders, readily soluble in water. They are stable towards alkalis but are decomposed into the corresponding diazonium salts, methylamino-butanol, and sulfuric acid by the action of acid reagents thereon.

*Example 3.*—10 parts by weight of sulfanilic acid ($NH_2$—$C_6H_4$—p—$SO_3H \cdot H_2O$) are diazotized in the usual manner with sodium nitrite and hydrochloric acid, and the resultant solution of the diazonium chloride is introduced into an aqueous solution of N-(beta-ethyl-cyclo-hexyl)-amino-ethyl-sulfuric acid, the solution comprising about 14 parts of the partial ester, 30 parts of sodium acetate, and 200 parts of water. The cooling, stirring, and addition of the diazonium chloride are regulated as in Example 1 so that the temperature does not exceed plus 5° C. The solution is then rendered slightly alkaline by addition of sodium carbonate. The diazoamino compound which forms is salted out by the addition of sodium chloride to the cold liquid, is filtered off and dried at a low temperature. The dry product is a yellowish powder very soluble in water. It may be represented by the following structural formula:

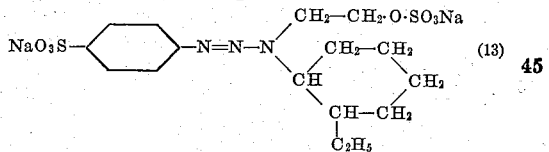

In a similar manner diazoamino compounds may be prepared from any of the carboxy- or sulfo-substituted anilines previously mentioned. Water-soluble azo dyestuffs may be prepared from any of the resultant diazoamino compounds by dissolving the diazoamino compound in water and adding thereto a coupling component in aqueous solution and thereafter acidifying the solution with a strong organic acid, for example formic acid, acetic acid, or oxalic acid until an acid solution of 3% to 10% strength is obtained. Preferably a small amount of sodium acetate is added prior to acidification. The formation of the azo dye can be accelerated by the application of heat and proceeds rapidly at a temperature of from 50° to 60° C. The coupling can be effected even more rapidly by using a mineral acid for acidification, for example hydrochloric acid, or an acid salt such as sodium bisulfate. The preparation of soluble azo dyestuffs of the above type also may be effected by introducing an aqueous solution of a coupling component into an aqueous solution of the diazoamino compound to which an acid previously has been added.

*Example 4.*—386 parts of the diazoamino compound obtained from 2-nitro-4-methyl-phenyldiazonium chloride and methylaminobutyl-sodium-sulfate and having the probable formula:

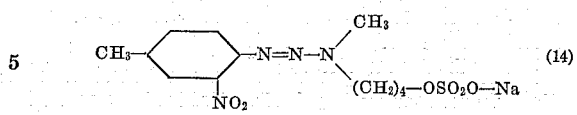

are dissolved in an aqueous solution comprising 1500 parts of water and about 100 parts of sodium acetate. To the resultant solution an aqueous alkaline solution comprising 220 parts of acetoacetanilide, 2000 parts of water, and 45 parts of NaOH is added. To this solution acetic acid is gradually added to accomplish neutralization, whereupon coupling proceeds progressively as more acetic acid is added. The rate of coupling may be accelerated by raising the temperature as in Example 3. Upon completion of the reaction a yellow dyestuff of the probable formula:

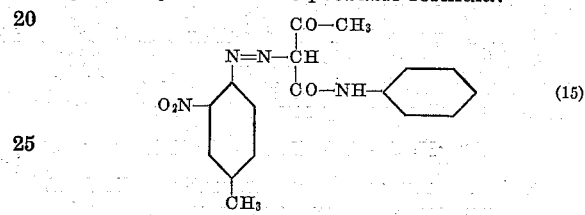

separates. This product may be filtered off, washed and dried in any suitable manner.

*Example 5.*—An aqueous solution of the diazoamino compound formed by coupling 2-nitro-4-methoxy-phenyl-diazonium chloride and cyclohexyl-amino-ethyl sulfuric acid, of the formula:

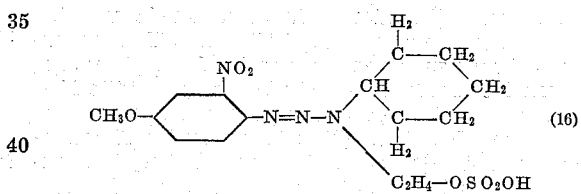

is treated with an alkaline aqueous aceto-acetic acid-2-toluidide solution containing an equimolar quantity of the aceto-acetic-toluidide, in the manner set forth in Example 4. An orange yellow azo dye of the probable formula:

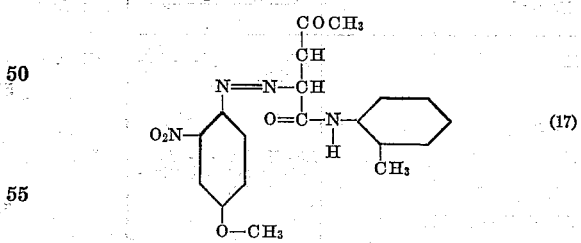

is thus obtained.

*Example 6.*—To 1000 parts by weight of an aqueous solution containing 4.6 parts by weight of the diazoamino compound obtained from 2-methyl-5-chlor-phenyl-diazonium-chloride and amino-diethyl-disodium-disulfate, and having the probable formula:

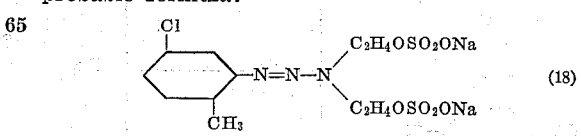

there is added 20 parts of acetic acid, 5 parts of alum, and 5 parts of sodium acetate.

Cotton fabric is impregnated in the customary manner with 2-hydroxy-3-naphthoic acid-2'-naphthylamide; for instance 50 grams of cotton may be impregnated with a liquor containing ½ to 5 grams of the amide, about 1 to about 10 cc. of 34° Bé. (28%) NaOH and about 1 to about 10 cc. of Turkey red oil of 50% strength.

The impregnated cotton is introduced into the bath containing the acidified diazoamino compound and the bath is slowly heated to about 50° to 60° C. The formation of the azo dyestuff on the fiber occurs very readily. It has the probable formula:

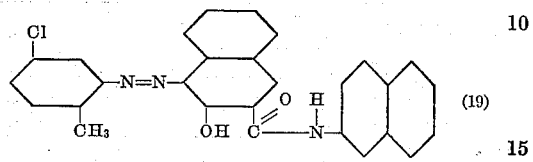

When the diazo compound can no longer be detected in the bath, the cotton is removed therefrom, is rinsed, soaped at boiling temperature, rinsed again, and dried. A brilliant red of excellent fastness is thus obtained.

*Example 7.*—The sodium salt of the diazoamino compound obtainable from 2-methoxy-5-chlorphenyl-diazonium chloride and N-methyl-aminobutyl-sulfuric acid and having the probable formula

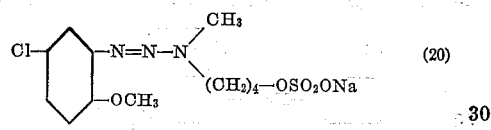

in aqueous solution, is mixed in equimolar ratio with 2-hydroxy-3-naphthoic-acid-2'-anisidide in an aqueous solution containing an equimolecular quantity of NaOH. The mixture is evaporated to dryness at a low temperature in vacuum.

70 parts by weight of the dry product are made up to 1000 parts with 50 parts Turkey red oil, 50 parts urea, 600 parts starch-tragacanth thickener, and the remainder water. The resultant printing paste may be printed on a textile fabric in the usual manner. The printed fabric is passed through an acid vapor ager at a temperature of 100° to 102° C., the ager being supplied with steam containing between say .05% and 1% of acetic and .05% and ½% of formic acid vapors to form the azo dye having the probable formula:

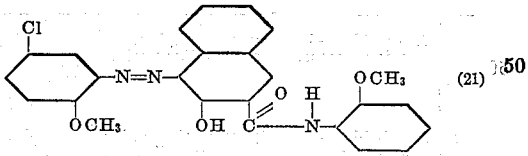

After a short period of contact of the printed fabric with the acid vapors in the ager, say 2 minutes, the material is rinsed, soaped, and dried. A very bright scarlet print is thus obtained.

*Example 8.*—A paste made in the same manner as in Example 7, but containing the diazoamino compound from 2,5-dichlorphenyl-diazonium chloride and methylaminobutyl-sulfuric acid together with 2-hydroxy-3-naphthoic acid-2',5'-dimethoxy-anilide as a coupling component instead of the diazoamino compound and coupling component of the previous example, yields a fast brown azo print on cotton, the azo compound having the probable formula:

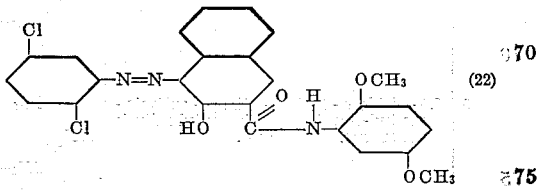

*Example 9.*—About 3½ parts of the diazoamino compound from 3-chlor-phenyl-diazonium-chloride and ethylaminobutyl sodium sulfate

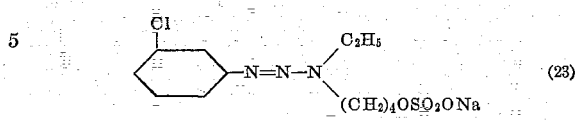

and about 2⅔ parts of 2-hydroxy-3-naphthoic acid-2'-toluidide were made up to a paste with hot water with the addition of 3 parts of the mono-ethyl ether of glycol. To this paste 3 parts by weight of 36° Bé. NaOH (30%), 60 parts by weight of neutral starch tragacanth thickener are added, and the product is made up to 100 parts by weight with water. This printing paste is applied to cotton fabric in the usual manner. The print is then steamed for around 5 minutes (or as an alternative is hung in contact with the atmosphere for about 21 hours). The cotton is then introduced for a short time into an aqueous bath maintained at about 80° to 90° C. and containing 50 grams acetic acid and 50 grams sodium sulfate per liter. By this treatment the azo dye of the probable formula:

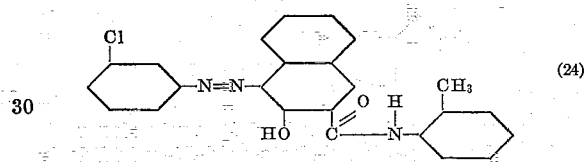

is developed on the fiber yielding a print of a very brilliant orange shade of excellent fastness. A similar result is obtained by developing the print in an acid bath containing formic acid, oxalic acid, or another strong organic acid instead of the acetic acid mixture. Likewise development in a vapor ager containing a volatile acid such as acetic acid produces similar results.

It will be obvious from the above examples that the procedure involved in the preparation and use of my new diazoamino compounds or compositions is capable of almost limitless variation.

Any of the usual methods of developing azo dyestuffs by coupling diazoamino compounds and coupling components may be employed with the diazoamino compounds of the present invention.

Diazoamino compounds from diacid esters of dialkylolamines and cycloalkyldiol amines as well as those from esters of mono-alkylolamines and cycloalkyl mon-olamines constitute an important group among the products of the present invention. The di-ester diazoamino compounds of greater importance may be represented by the general formula $$Ar-N=N-N(-R_5OAcylOMe)_2 \quad (25)$$

wherein Ar represents an aromatic radical, $R_5$ represents an alkyl preferably with 4 carbon atoms or cycloalkyl group, Acyl represents a polybasic acid group as described in connection with Formula (1) and Me represents hydrogen, sodium, or potassium. The sulfuric acid esters of the following general formula possess especial advantages in that they are highly soluble in water and alkaline aqueous solutions:

$$Ar-N=N-N(-R_5O-SO_2OMe)_2 \quad (26)$$

wherein Ar represents an aromatic radical, $R_5$ represents an alkyl preferably with 4 carbon atoms or cycloalkyl group, and Me represents H or Na.

The following table further illustrates the nature of compositions of dyes that may be obtained by the application of my invention. In this table are shown the shades of dyeings obtainable with the diazoamino compounds and the coupling components set forth. It will be understood that such dyeings may be obtained by substantive preparation, or by printing a textile fiber with a printing paste containing the diazoamino compound and coupling component and subsequently developing, or by impregnating the textile fiber with one of the components and subsequently developing the dye by bringing the impregnated fiber into contact with the other component under conditions favoring azo coupling.

| No. | Base | Stabilizer | Formula | Coupling component | Shade |
|---|---|---|---|---|---|
| 1 | 2.5-dichloro-1-aminobenzene. | Hydroxy ethyl amino ethyl sulfuric acid. | HN(CH₂—CH₂—OH)(CH₂—CH₂—O.SO₃H) | Diacetoacetyl-o-tolidide. | Yellow. |
| 2 | 2.5-dichloro-1-aminobenzene. | Hydroxy ethyl amino ethyl phthalic acid. | HN(CH₂—CH₂—OH)(CH₂—CH₂—OCO—C₆H₄—COOH) | 2.5-dichloro-4-nitro-1-aceto-acetylamino-benzene. | Do. |
| 3 | 4-chloro-2-amino-1-methylbenzene. | Sulfonic ester from methyl ethanolamine and 4-sulfo benzoic acid. | HN(CH₃)(CH₂—CH₂—O.SO₂—C₆H₄—COOH) | Diacetoacetyl-o-tolidide | Do. |
| 4 | 4.5-dichloro-2-amino-1-methylbenzene. | Sulfonic ester from: methylethanolamine and 4-sulfobenzoic acid. |  | do. | Do. |
| 5 | 4-chloro-2-amino-1-methoxy benzene. | Methyl-amino-ethyl-dichlorphthalic acid. | HN(CH₃)(CH₂—CH₂—OCO—C₆H₃(COOH)(Cl)(Cl)) | do. | Do. |
| 6 | 2.5-dichloro-1-methyl-4-aminobenzene. | N-ethane-sulfonic-amino-butyl sulfuric acid. | HN(CH₂—CH₂—SO₃H)(CH₂—CH₂—CH₂—CH₂—O.SO₃H) | do. | Do. |

| No. | Base | Stabilizer | Formula | Coupling component | Shade |
|---|---|---|---|---|---|
| 7 | 5-nitro-2-amino-1-methylbenzene. | Acid ester from methyl ethanol amine and benzene disulfonic acid. | HN(CH₃)(CH₂—CH₂—O.SO₂—C₆H₄—SO₃H) | Sodium compound of 4 - nitro - 2.5 - dimethoxy - 1 - acetoacetyl-amino-benzene. | Yellow. |
| 8 | 3-chloro-1-amino-benzene. | Sulfonic ester from: methyl-ethanolamine and 4-sulfo benzoic acid. | | 2 - hydroxy - naphthalene - 3 - carboxylic acid-o-tolidide. | Orange. |
| 9 | 3-chloro-1-amino-benzene. | Methyl-amino-ethyl-dichlorphthalic acid. | | Sodium compound of 2-hydroxy-naphthalene-3-carboxylic acid o-toluidide. | Do. |
| 10 | 2.5-dichloro-1-amino-benzene. | Disulfonic ester from dipropanol amine and 1-benzene-carboxy-4-sulfonic acid. | HN(CH₂—CH₂—CH₂—O.SO₂—C₆H₄—COOH)(CH₂—CH₂—CH₂—O.SO₂—C₆H₄—COOH) | 2-hydroxynaphthalene-3-carboxylic acid-o-phenetidide. | Do. |
| 11 | 2.5-dichloro-1-amino benzene. | Sulfonic ester from methyl ethanolamine and 4-sulfo benzoic acid. | | Sodium compound of 2-hydroxy-naphthalene-3-carboxylic acid o-phenetidide. | Do. |
| 12 | 4-chloro-2-amino-1-methylbenzene. | Methyl-amino-ethyl-maleic acid ester. | HN(CH₃)(CH₂—CH₂—OCO—CH=CH—COOH) | 2-hydroxynaphthalene-3-carboxylic acid-o-phenetidide. | Scarlet. |
| 13 | 2-amino-4-methxy-5-benzoyl-amino-1-chloro-benzene. | N-n-butyl-amino-ethyl sulfuric acid ester. | HN(CH₂—CH₂—CH₂—CH₃)(CH₂—CH₂—O.SO₃H) | 2-hydroxy-naphthalene-3-carboxylic acid-o-toluidide. | Violet. |
| 14 | 2.5-dichloro-1-amino-benzene. | Amino-isohexyl-beta-sulfuric acid ester. | H₂N—CH₂—CH(O—SO₃H)—CH₂—CH(CH₃)(CH₃) | 2-hydroxynaphthalene-3-carboxylic acid-o-anisidide. | Scarlet. |
| 15 | 2.5-dichloro-4-amino-1-methylbenzene. | Amino-isohexyl-beta-sulfuric acid ester. | | Sodium compound of 2-hydroxy-naphthalene-3-carboxylic acid o-anisidide. | Do. |
| 16 | 3-chloro-1-amino-benzene. | Tetra-hydro-naphthylamine-ethyl sulfuric acid. | | 2-hydroxynaphthalene-3-carboxylic acid-o-anisidide. | Red. |
| 17 | 4.6-dichloro-2-amino-1-methylbenzene. | Di-acid ester from diethanolamine and 3-sulfo benzoic acid. | HN(CH₂—CH₂—O.SO₂—C₆H₄—COOH)(CH₂—CH₂—O.SO₂—C₆H₄—COOH) | 2-hydroxynaphthalene-3-carboxylic acid-p-anisidide. | Do. |
| 18 | 4.6-dichloro-2-amino-1-methylbenzene. | Piperidine-beta-sulfuric acid ester. | HN(piperidine ring with CH—O.SO₃H) | Sodium compound of 2-hydroxynaphthalene - 3 - carboxylic acid o-anisidide. | Do. |
| 19 | 4-chloro-2-amino-1-methylbenzene. | Cyclo-hexyl-amino-ethyl-sulfuric acid ester. | HN(cyclohexyl)(CH₂—CH₂—O.SO₃H) | ......do........ | Do. |
| 20 | 4-chloro-2-amino-1-methoxy-benzene. | Pyrrolidine-alpha-methyl-sulfuric acid. | HN(pyrrolidine ring with CH₂—O.SO₃H) | ......do........ | Do. |
| 21 | 4-chloro-2-amino-1-methylbenzene. | N-beta-ethyl-hexyl-amino-ethyl-sulfuric acid. | NH—CH₂—CH₂—O.SO₃H; CH(CH₂—CH₂—C₂H₅)(CH₂—CH₂—CH₃) | 2-hydroxynaphthalene - 3 - carboxylic acid-o-toluidide. | Do. |
| 22 | 4-chloro-2-amino-1-methylbenzene. | Sulfonic ester from methyl-ethanolamine and 4-sulfo-benzoic acid. | | Sodium compound of 2-hydroxynaphthalene - 3 - carboxylic acid anilide. | Do. |
| 23 | 4-amino-1.3-dimethyl-benzene. | Ester from N-methyl-ethanolamine and benzene disulfo acid. | HN(CH₃)(CH₂—CH₂—O.SO₂C₆H₄—SO₃H) | 2-hydroxynaphthalene - 3 - carboxylic acid-2'-methyl-4'-methoxyanilide. | Turkey red. |

| No. | Base | Stabilizer | Formula | Coupling component | Shade |
|---|---|---|---|---|---|
| 24 | 4.5-dichloro-2-amino-1-methylbenzene. | Ester from N-methyl-ethanolamine and benzene disulfoacid. | | Sodium compound of 2-hydroxynaphthalene-3-carboxylic acid m-nitranilide. | Turkey red. |
| 25 | 5-nitro-2-amino-1-methylbenzene. | 2-ethylamino-4-chlorphenoxy-butyl sulfuric acid. | | 2-hydroxynaphthalene-3-carboxylic acid o-toluidide. | Bordeaux. |
| 26 | 5-nitro-2-amino-1-methoxybenzene. | Cyclo-hexyl-amino-ethyl-sulfuric acid. | | Sodium compound of 2-hydroxy-naphtalene-3-carboxylic acid alpha naphthylamide. | Do. |
| 27 | 3-amino-4-methoxy-6-nitro-1-methylbenzene. | Hydroxy-ethyl-amino-butyl-sulfuric acid. | $HN\begin{array}{c}CH_2.CH_2OH\\(CH_2)_4.SO_4H\end{array}$ | 2-hydroxynaphthalene-3-carboxylic acid alpha naphthylamide. | Do. |
| 28 | 3-amino-4-methoxy-6-nitro-1-methylbenzene. | Hydroxy-ethyl-amino-butyl-sulfuric acid. | | Sodium compound of 2-hydroxy-naphthalene-3-carboxylic acid alpha naphthylamide. | Do. |
| 29 | 3-amino-4-methoxy-6-nitro-1-methylbenzene. | Pyrrolidine-alpha-methyl sulfuric acid. | | 2-hydroxynaphthalene-3-carboxylic acid beta naphthylamide. | Do. |
| 30 | 3-amino-4-methoxy-6-nitro-1-methylbenzene. | Methyl-amino-ethyl-acid succinate. | $HN\begin{array}{c}CH_3\\CH_2-CH_2-OCO-CH_2-COOH\end{array}$ | 2-hydroxynaphthalene-3-carboxylic acid 2.5′ dimethoxy-anilide. | Do. |
| 31 | 5-nitro-2-amino-1-methoxybenzene. | Methyl-amino-ethyl-acid chlor-maleate. | $HN\begin{array}{c}CH_3\\CH_2-CH_2-OCO-CH=C(Cl)-COOH\end{array}$ | Sodium compound of 2-hydroxy-naphthalene-3-carboxylic acid alpha naphthylamide. | Do. |
| 32 | 3-amino-4-methoxy-6-benzoylamino-1-methyl benzene. | Ester from N-methyl-ethanolamine and benzene-disulfo acid. | | Sodium compound of 2-hydroxy-naphthalene-3-carboxylic acid anilide. | Violet. |
| 33 | 3-amino-4-methoxy-6-benzoylamino-1-methylbenzene. | Cyclo-hexyl-amino-ethyl-sulfuric acid. | | Sodium compound of 2-hydroxynaphthalene-3-carboxylic acid o-toluidide. | Do. |
| 34 | 3-amino-4-methoxy-6-benzoylamino-1-methylbenzene. | Hydroxy-ethyl-amino-butyl-sulfuric acid. | | 2-hydroxynaphthalene-3-carboxylic acid o-toluidide. | Do. |
| 35 | 6-amino-4-benzoylamino-1.3-dimethoxybenzene. | Hydroxy-ethyl-amino-ethyl-sulfuric acid. | | Sodium compound of 2-hydroxynaphthalene-3-carboxylic acid anilide. | Do. |
| 36 | 6-amino-4-benzoylamino-1.3-dimethoxybenzene. | Ester from N-isopropyl-amino-ethanol and ethane disulfo acid. | | 2-hydroxynaphthalene-3-carboxylic acid o-toluidide. | Do. |
| 37 | 6-amino-4-benzoylamino-1.3-dimethoxybenzene. | Ethyl-amino-butyl-sulfuric acid. | $C_2H_5-NH-CH_2-CH_2-CH_2-CH_2-OSO_3H$ | Sodium compound of 2-hydroxynaphthalene-3-carboxylic acid 5′-chloro-2′-toluidide. | Do. |
| 38 | 4.4′-diamino-3.3′-dimethoxyazobenzene. | Ethyl-amino-ethyl-phthalic acid. | $\begin{array}{c}C_2H_5\\NH-C_2H_4.O.CO-C_6H_{10}-COOH\end{array}$ | 2-hydroxynaphthalene-3-carboxylic acid o-toluidide. | Blue. |
| 39 | 6-amino-3-benzoylamino-1.4-diethoxybenzene. | Pyrrolidine-alpha-methyl-sulfuric acid. | | Sodium compound of 2-hydroxynaphthalene-3-carboxylic acid o-toluidide. | Do. |
| 40 | 6-amino-3-benzoylamino-1.4-diethoxybenzene. | Methyl-amino-propyl-sulfuric acid ester. | $HN\begin{array}{c}CH_3\\CH_2-CH_2-CH_2-O.SO_3H\end{array}$ | 2-hydroxynaphthalene-3-carboxylic acid anilide. | Do. |
| 41 | 6-amino-3-benzoylamino-4-ethoxy-1-methoxybenzene. | Amino-diethyl-sulfuric acid. | $HN\begin{array}{c}CH_2-CH_2-O.SO_3H\\CH_2-CH_2-O.SO_3H\end{array}$ | Sodium compound of 2-hydroxynaphthalene-3-carboxylic acid o-toluidide. | Do. |
| 42 | 6-amino-3-benzoylamino-4-ethoxy-1-methoxybenzene. | Methyl-amino-ethyl-phosphoric acid. | $HN\begin{array}{c}CH_3\\CH_2-CH_2-O.PO(OH)_2\end{array}$ | Sodium compound of 2-hydroxy-naphthalene-3-carboxylic acid anilide. | Do. |
| 43 | 6-amino-3-benzoylamino-1.4-dimethoxybenzene. | Amino-cyclo-hexyl-sulfuric acid. | $H_2N-CH\begin{array}{c}CH_2-CH_2\\CH_2\\CH-CH_2\\O.SO_3H\end{array}$ | Sodium compound of 2-hydroxy-naphthalene 3-carboxylic acid o-toluidide. | Do. |

| No. | Base | Stabilizer | Formula | Coupling component | Shade |
|---|---|---|---|---|---|
| 44 | 6-amino-3-benzoylamino-1,4-dimethoxybenzene. | Ethyl-amino-butyl-phosphoric acid. | 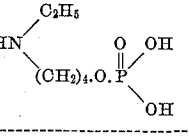 | Sodium compound of 2-hydroxy-naphthalene-3-carboxylic acid o-toluidide. | Do. |
| 45 | 4-chloro-2-amino-1-methylbenzene. | Methyl-amino-propyl-sulfuric acid ester. | | Sodium compound of 2-hydroxy-carbazole-o-carboxylic acid 2'-toluidide. | Brown. |
| 46 | 4-nitro-4'-amino-2'5'-dimethoxyazo-benzene. | Acid ester from methyl-ethanol-amine and benzene-disulfonic acid. | | Sodium compound of 2-hydroxy-naphthalene-3-carboxylic acid o-toluidide. | Black. |
| 47 | 3-nitro-4'-amino-2'5'-dimethoxyazo-benzene. | Hydroxy-ethyl-amino-ethyl-sulfuric acid. | | Sodium compound of 2-hydroxy-naphthalene-3-carboxylic acid alpha-naphthylamide. | Do. |
| 48 | 4-methyl-4'-amino-2-methoxy-5-methylazobenzene. | N-ethane-sulfonic amino-butyl-sulfuric acid. | | Sodium compound of 2-hydroxy-naphthalene-3-carboxylic acid o-toluidide. | Do. |
| 49 | 4-chloro-4'-amino-2'5'-diethoxy-azo-benzene. | Hydroxy-ethyl-amino-butyl-sulfuric acid. | | Sodium compound of 2-hydroxy-naphthalene-3-carboxylic acid alpha-naphthylamide. | Do. |

I claim:

1. As a new compound a diazoamino ester of the following general formula

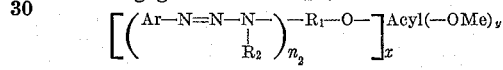

wherein Ar represents an aromatic radical, $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Acyl represents the residue of sulphuric acid, phosphoric acid, or a polybasic acid of the benzene or aliphatic series, Me represents hydrogen or a metal, $n_2$ represents a positive integer, and $x$ and $y$ each represents a positive integer.

2. As a new compound a diazoamino ester of the following general formula

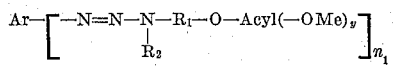

wherein Ar represents an aromatic radical, $R_1$ represents a saturated aliphatic or cycloaliphatic group, $R_2$ represents hydrogen, a saturated aliphatic or cyclo-aliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, $y$ represents a positive integer, and $n_1$ represents an integer less than 4.

3. As a new compound a diazoamino ester of the following general formula

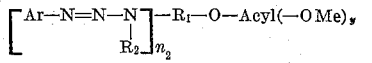

wherein Ar represents an aromatic radical, $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, $y$ represents a positive integer, and $n_2$ represents an integer less than 4.

4. As a new compound a diazoamino ester of the following general formula

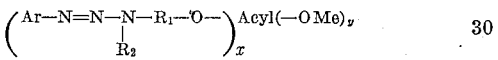

wherein Ar represents an aromatic radical, $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, and $x$ and $y$ represent positive integers.

5. As a new compound a diazoamino ester of the following general formula

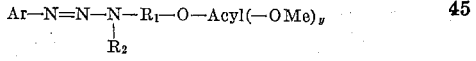

wherein Ar represents an aromatic radical free from sulfonate and carboxylate groups, $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, and $y$ represents a positive integer.

6. As a new compound a diazoamino ester of the following general formula

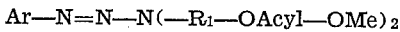

wherein Ar represents an aromatic radical, $R_1$ represents a saturated aliphatic or cycloaliphatic group, and Me represents hydrogen or a monovalent metal.

7. As a new compound, an aromatic diazoamino-aliphatic sulfuric acid partial ester.

8. As a new compound a diazoamino ester of the following general formula

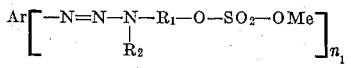

wherein Ar represents an aromatic radical free from sulfonate and carboxylate groups, $R_1$ represents a saturated aliphatic or cycloaliphatic hydrocarbon group, $R_2$ represents hydrogen, a saturated aliphatic or cycloaliphatic group, or an aromatic group, Me represents hydrogen or a monovalent metal, and $n_1$ represents an integer less than 4.

9. As a new compound a diazoamino ester of the following general formula

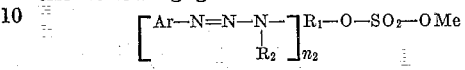

wherein Ar represents an aromatic radical, $R_1$ represents a saturated aliphatic or cycloaliphatic hydrocarbon group, $R_2$ represents hydrogen, a saturated aliphatic or cycloaliphatic group, or an aromatic group, Me represents hydrogen or a monovalent metal, and $n_2$ represents an integer less than 4.

10. As a new compound a diazoamino ester of the following general formula

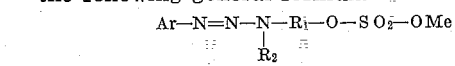

wherein Ar represents an aromatic radical free from sulfonate and carboxylate groups, $R_1$ represents a saturated aliphatic or cycloaliphatic hydrocarbon group, $R_2$ represents hydrogen, a saturated aliphatic or cycloaliphatic group, or an aromatic group, and Me represents hydrogen or a monovalent metal.

11. As a new compound a diazoamino ester of the following general formula $$Ar-N=N-N(-R_1-O-SO_2-OMe)_2$$

wherein Ar represents an aromatic radical, $R_1$ represents a saturated aliphatic or cycloaliphatic hydrocarbon group, and Me represents hydrogen or a monovalent metal.

12. As a new compound, an aromatic diazoamino-aliphatic sulfuric acid partial ester in the form of an alkali-metal salt.

13. As a new compound an aromatic diazoaminobutyl sulfuric acid partial ester in the form of a sodium salt.

14. As a new compound an aromatic diazoamino-di(butyl sulphuric acid) partial ester.

15. The method of producing a diazoamino compound of the type set forth in claim 1, which comprises coupling a diazonium salt of the general formula

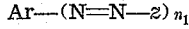

wherein Ar represents an aromatic radical, $z$ represents an acid group and $n_1$ represents a positive integer, with an amino partial ester of the general formula

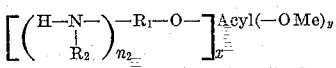

wherein $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Acyl represents the residue of sulfuric acid, phosphoric acid, or a polybasic acid of the benzene or aliphatic series, Me represents hydrogen or a metal, $n_2$ represents a positive integer, and $x$ and $y$ each represents a positive integer.

16. The method of producing a diazoamino compound of the type set forth in claim 2, which comprises coupling in an alkaline medium an aromatic diazonium salt of the general formula

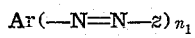

wherein Ar represents an aromatic radical, $z$ represents an acid group, and $n_1$ represents an integer less than 4, with an amino partial ester of the general formula

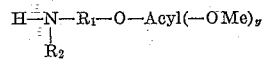

wherein $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Acyl represents the residue of sulfuric acid, phosphoric acid, or a polybasic acid of the benzene or aliphatic series, Me represents hydrogen or a monovalent metal, and $y$ represents a positive integer.

17. The method of producing a diazoamino compound of the type set forth in claim 3, which comprises coupling in an alkaline medium an aromatic diazonium salt of the general formula $$AR-N=N-z$$

wherein Ar represents an aromatic radical and $z$ represents an acid group, with an amino partial ester of the general formula

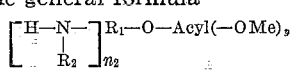

wherein $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Acyl represents the residue of sulfuric acid, phosphoric acid, or a polybasic acid of the benzene or aliphatic series, Me represents hydrogen or a monovalent metal, $y$ represents a positive integer, and $n_2$ an integer less than 4.

18. The method of producing a diazoamino compound of the type set forth in claim 4, which comprises coupling in an alkaline solution a diazonium salt of the general formula $$Ar-N=N-z$$

wherein Ar represents an aromatic radical and $z$ represents an acid group, with an amino partial ester of the general formula

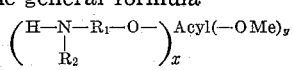

wherein Ar represents an aromatic radical, $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, and $x$ and $y$ represent positive integers.

19. The method of producing a diazoamino compound of the type set forth in claim 5, which comprises coupling a diazonium salt of the general formula $$Ar-N=N-z$$

wherein Ar represents an aromatic radical free from sulfonate and carboxylate groups and $z$ represents an acid group, with an amino ester of the general formula

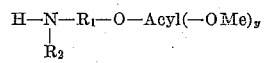

wherein $R_1$ represents a saturated aliphatic or cycloaliphatic group, $R_2$ represents hydrogen, a saturated aliphatic or cycloaliphatic group, or an aromatic group, or $R_1$ and $R_2$ together represent a polymethylene chain forming a heterocyclic ring with the —N—, Me represents hydrogen or a monovalent metal, Acyl represents the residue of sulfuric acid, phosphoric acid, or a polybasic acid of the benzene or aliphatic series, and $y$ represents a positive integer.

20. The method of producing a diazoamino compound of the type set forth in claim 8, which comprises coupling in an alkaline medium an aromatic diazonium salt of the general formula $$Ar(-N=N-z)_{n_1}$$

wherein Ar represents an aromatic radical free from sulfonate and carboxylate groups, $z$ represents an acid group, and $n_1$ represents an integer less than 4, with an amino partial ester of the general formula $$H-N(R_2)-R_1-O-SO_2-OMe$$

wherein $R_1$ represents a saturated aliphatic or cycloaliphatic hydrocarbon group, $R_2$ represents hydrogen, a saturated aliphatic or cycloaliphatic group, or an aromatic group, and Me represents hydrogen or a monovalent metal.

21. The method of producing a diazoamino compound of the type set forth in claim 9, which comprises coupling in an alkaline medium an aromatic diazonium salt of the general formula $$Ar-N=N-z$$

wherein Ar represents an aromatic radical and $z$ represents an acid group, with an amino partial ester of the general formula $$\left[ H-N(R_2)- \right]_{n_2} R_1-O-SO_2-OMe$$

wherein $R_1$ represents a saturated aliphatic or cycloaliphatic hydrocarbon group, $R_2$ represents hydrogen, a saturated aliphatic or cycloaliphatic group, or an aromatic group, Me represents hydrogen or a monovalent metal, and $n_2$ represents an integer less than 4.

22. The method of producing a diazoamino compound of the type set forth in claim 10, which comprises coupling in an alkaline medium a diazonium salt of the general formula $$Ar-N=N-z$$

wherein Ar represents an aromatic radical free from sulfonate and carboxylate groups and $z$ represents an acid group, with an amino partial ester of the general formula $$H-N(R_2)-R_1-O-SO_2-OMe$$

wherein $R_1$ represents a saturated aliphatic or cycloaliphatic hydrocarbon group, $R_2$ represents hydrogen, a saturated aliphatic or cycloaliphatic group, or an aromatic group, and Me represents hydrogen or a monovalent metal.

JEAN G. KERN.